July 1, 1930.  C. A. WALSH  1,769,196

DENTIST'S MIXING BALL

Filed March 9, 1929

Inventor
Carlen A. Walsh,
by Harold J. Clark
Attorney

Patented July 1, 1930

1,769,196

UNITED STATES PATENT OFFICE

CARLIN A. WALSH, OF CAMBRIDGE, MASSACHUSETTS

DENTIST'S MIXING BALL

Application filed March 9, 1929. Serial No. 345,861.

The present invention relates to mixing balls particularly adaptable for use by dentists in pulverizing and mixing plaster, although it is also capable of use in mixing amalgam or other compositions.

An important object of the present invention is the provision of a dentist's mixing ball which will be simple and economical to manufacture and assemble, which will be rugged and sturdy, and which will be efficient in operation.

Another object of the invention resides in the provision of a spherical head or ball of substantial size which will enable a dentist to thoroughly pulverize a plaster composition, removing all lumps and bubbles therefrom and producing a smooth plaster for dental purposes.

A still further object of the invention resides in providing a handle for this ball or head, said handle being detachable or removable from said head for renewing either the ball or the handle. This feature of detachability will also be found useful in shipping these articles, they being readily assembled in a few moments time.

The handle is preferably united with the ball by means of a threaded union, for greatest strength and ruggedness. The ball or head is preferably constructed of glass, onyx or other vitreous substance or composition, although other substances, such as rubber, may be utilized if desired.

The device of the present invention is adapted to be hand operated, not requiring attachment to a dental engine or the like for operation. It is inexpensive and easy to operate, and is extremely efficient in its action.

I believe that the dentist's mixing ball above briefly described is novel, and I have therefore claimed the same in the present application.

The above and other objects of the invention, details of construction and advantages, will be hereinafter more fully pointed out, described and claimed.

Referring to the drawings, illustrating preferred embodiments of the present invention, Fig. 1 is a side elevation, partly in section, of the preferred form of the device;

Figure 1:
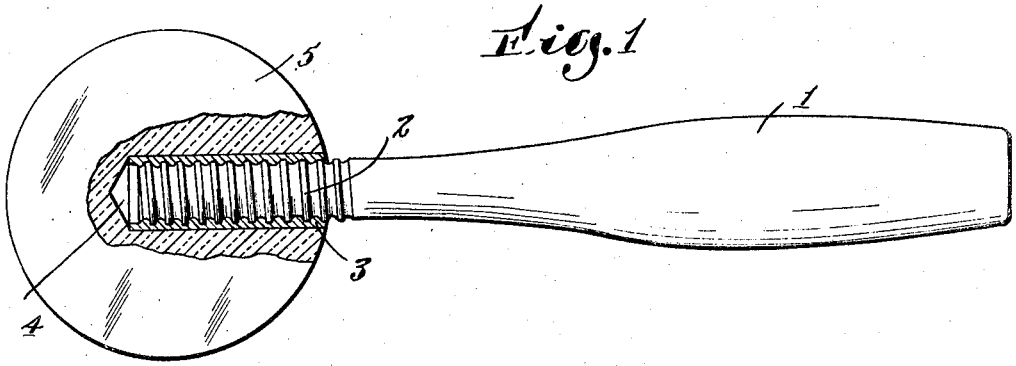

Referring now to the drawings for a particular description of the invention, 1 designates a handle, preferably of wood and shaped to fit the hand of the operator, having one end thereof threaded as at 2. This threaded portion 2 of the handle 1 is adapted to thread into a threaded sleeve 3, preferably formed of metal, and secured in the recess 4 of the ball 5 by cement or any other suitable adhesive, or in other suitable ways. The ball 5 is preferably formed of glass, onyx, or other vitreous material or compositions, thus giving a smooth glassy surface on the exterior thereof. Because of the spherical contour of the ball or head 5 the dentist will be enabled to effect a thorough and complete pulverizing of the plaster or other material upon which he is working, completely crushing the same and eliminating any lumps, bubbles or other undesirable elements in the mixture or substance.

Should either the ball 5 or handle 1 become broken or damaged, they may be readily separated for renewal of the damaged part. Also the handle 1 may be readily removed should it be desired to clean the ball or head 5 with any ingredient which would be injurious to the wood of the handle.

Figure 2:
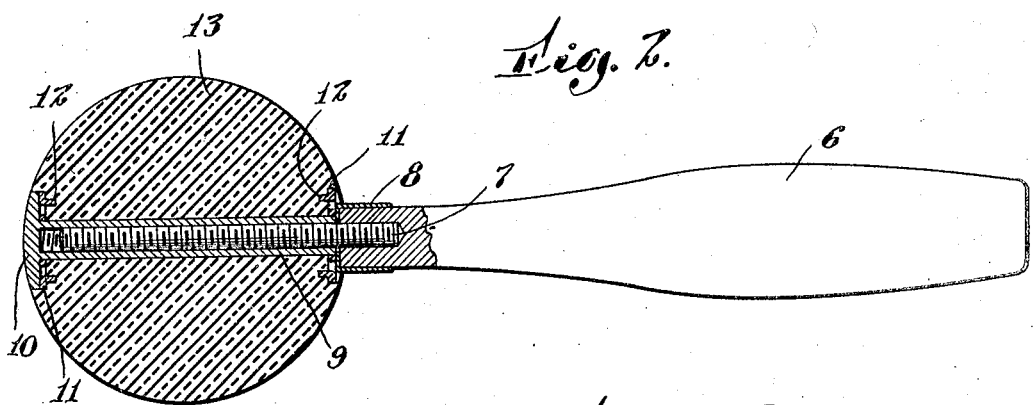
Fig. 2 is a side elevation, partly in section, of a slightly modified form.
Figure 4:
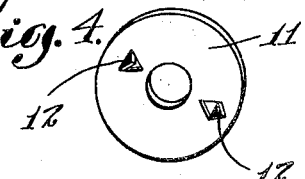
Fig. 4 is a perspective view of one of the washers utilized.

In Fig. 2 I have illustrated a modified form of the device, wherein a rubber ball or spherical member 13 is utilized in place of the vitreous ball 5. In this form of the invention the handle 6 is provided with a projecting threaded metal stem 7, a metallic ferrule 8 projecting and strengthening the end of the handle 6. Driven through the ball 13 from the side opposite the handle 6 is a metallic jacket or sleeve 9, threaded on its interior and having a rounded head 10 to preserve the spherical contour of the ball 13. The stem 7 is threaded into the sleeve 9 and extends substantially the length thereof for increased strength and bearing. Washers 11 are provided, one beneath the head 10 and one adapted to be engaged by the ferrule 8, to prevent sinking of the head or ferrule into the body of the ball 13. Each washer is provided with anchors 12, these anchors being formed as prongs struck up from the body of the washer. These anchors will secure the washers in place in the ball 13, an prevent rotation of said washers, thus eliminating wear on the ball 13 which would otherwise occur.

Figure 3:
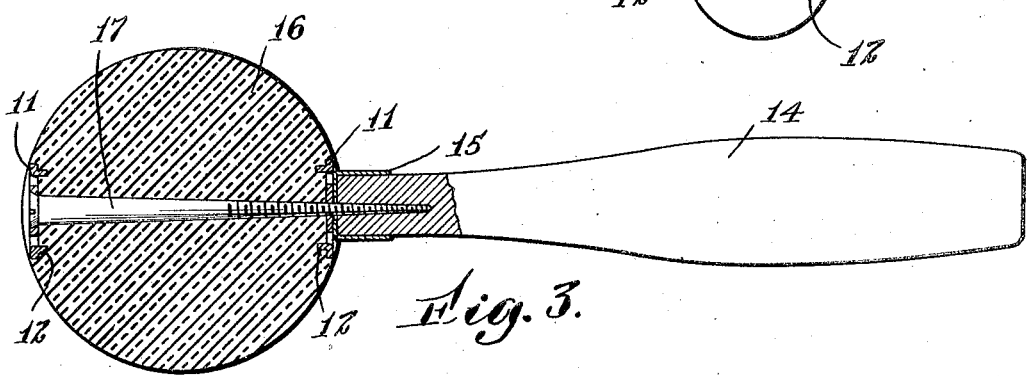
Fig. 3 is a side elevation, partly in section, illustrating a modified method of uniting the ball and handle.

In Fig. 3 I have illustrated a modified method or form of union between the handle and ball. In this form the handle 14 has a ferrule 15, preferably of metal, at the small end thereof. The ball 16, which is also of rubber similar to the ball 13, has a pair of washers 11 countersunk therein at opposite sides thereof, each of these washers having a plurality of anchors 12 as above described.

A metallic screw 17 extends through the ball 16, bearing against one of the washers 11 and being threaded into the ferruled end of the handle 14. This modified form of attachment is within the scope of the present invention, being an alternative of the form of union illustrated in Fig. 2.

The utility, advantages, efficiency and benefits of my novel device will be instantly appreciated by the users of same and by others skilled in the art.

While I have necessarily described my present invention somewhat in detail, it will be appreciated that I may vary the size and shape of the parts within reasonably wide limits without departing from the spirit of the invention.

My invention is further described and defined in the form of a claim as follows:

A dentist's mixing ball comprising a handle shaped to fit the hand, a spherical head, means extending substantially entirely through said head and removably attaching said head to said handle, washers countersunk in said head against which the attaching means and the handle will bear, and anchoring prongs on said washers to prevent rotation thereof.

In testimony whereof, I sign my name to this specification.

CARLIN A. WALSH.